(12) United States Patent
Quitter et al.

(10) Patent No.: US 8,525,073 B2
(45) Date of Patent: Sep. 3, 2013

(54) DEPTH AND BREAKTHROUGH DETECTION FOR LASER MACHINING

(75) Inventors: John Patrick Quitter, Farmington, CT (US); Chester E. Yaworsky, Jr., Glastonbury, CT (US); Hai-Lung Tsai, Rolla, MO (US)

(73) Assignee: United Technologies Corporation, Hartford, CT (US)

( * ) Notice: Subject to any disclaimer, the term of this patent is extended or adjusted under 35 U.S.C. 154(b) by 748 days.

(21) Appl. No.: 12/694,435

(22) Filed: Jan. 27, 2010

(65) Prior Publication Data

US 2011/0180521 A1 Jul. 28, 2011

(51) Int. Cl.
*B23K 26/00* (2006.01)
*B23K 26/36* (2006.01)
*B23K 26/38* (2006.01)

(52) U.S. Cl.
USPC ............ 219/121.67; 219/121.68; 219/121.73; 219/121.75; 219/121.76; 219/121.81; 219/121.83

(58) Field of Classification Search
USPC ............... 219/121.6, 121.67, 121.68, 121.69, 219/121.7, 121.71, 121.72, 121.73, 121.81, 219/121.83, 121.85, 121.76, 121.75
See application file for complete search history.

(56) References Cited

U.S. PATENT DOCUMENTS

| | | | |
|---|---|---|---|
| 3,689,159 A | 9/1972 | Taniguchi et al. | |
| 4,672,727 A | 6/1987 | Field | |
| 4,870,244 A * | 9/1989 | Copley et al. ............... | 219/121.7 |
| 4,873,414 A | 10/1989 | Ma et al. | |
| 5,026,964 A | 6/1991 | Somers et al. | |
| 5,026,979 A | 6/1991 | Ortiz, Jr. et al. | |
| 5,045,669 A | 9/1991 | Ortiz, Jr. et al. | |
| 5,159,402 A | 10/1992 | Ortiz, Jr. | |
| 5,914,060 A | 6/1999 | Flis et al. | |
| 6,054,673 A | 4/2000 | Chen | |
| 6,140,604 A | 10/2000 | Somers et al. | |
| 6,172,331 B1 | 1/2001 | Chen | |
| 6,229,113 B1 | 5/2001 | Brown | |
| 6,329,633 B1 | 12/2001 | Lamm et al. | |
| 6,359,254 B1 | 3/2002 | Brown | |
| 6,396,069 B1 * | 5/2002 | MacPherson et al. ... | 250/559.22 |
| 6,713,718 B1 | 3/2004 | Lu | |
| 6,720,567 B2 * | 4/2004 | Fordahl et al. ........... | 250/559.29 |

(Continued)

FOREIGN PATENT DOCUMENTS

EP 0013657 * 7/1980
WO WO 2009/047350 A1 4/2009

OTHER PUBLICATIONS

The Jun. 14, 2011 European Search Report for Counterpart European Application No. 11250092.

*Primary Examiner* — Mary Wilczewski
(74) *Attorney, Agent, or Firm* — Kinney & Lange, P.A.

(57) ABSTRACT

A system comprises a working laser beam, a sensing laser beam, first and second optical elements, an optical sensor, an aperture and a controller. The first optical element generates a coaxial beam from the working laser beam and the sensing laser beam. The second optical element focuses the coaxial beam onto a workpiece, such that the working laser beam machines the workpiece and the sensing laser beam reflects from the workpiece. The optical sensor senses an intensity of the reflected sensing beam. The aperture determines a focus position by translating along the reflected sensing beam, such that the reflected intensity is maximized. The controller determining a machining parameter of the working laser beam, based on the focus position.

20 Claims, 4 Drawing Sheets

(56) References Cited

U.S. PATENT DOCUMENTS

| | | | |
|---|---|---|---|
| 6,727,462 B2* | 4/2004 | Mayer | 219/121.73 |
| 2002/0153500 A1* | 10/2002 | Fordahl et al. | 250/559.29 |
| 2006/0096964 A1 | 5/2006 | Fordahl | |
| 2006/0237406 A1 | 10/2006 | Schmidt-Sandte et al. | |
| 2006/0280212 A1* | 12/2006 | Lu et al. | 372/38.02 |
| 2011/0180521 A1* | 7/2011 | Quitter et al. | 219/121.73 |

* cited by examiner

DEPTH AND BREAKTHROUGH DETECTION FOR LASER MACHINING

BACKGROUND

This invention relates generally to machining, and in particular to laser machining techniques for precision parts manufacture. Specifically, the invention concerns optical detection and control systems for laser cutting, laser drilling, etching, coating removal and other laser-based manufacturing processes.

Laser drilling and laser machining are forms of laser ablation, in which material is removed from a body by heating it with a laser so that it undergoes a chemical or physical phase change, for example by burning or melting. Depending upon the wavelength, beam intensity and workpiece composition, the phase change can also involve evaporation, sublimation, or, at higher intensities, plasma formation.

In surface machining applications, ablation occurs primarily within a relatively small distance of the surface, for example to form patterns, rough surfaces and other textures. Surface machining techniques also include engraving characters and symbols, forming or removing surface coatings, and laser ablation cleaning.

In other techniques the machining depth is greater, and ablation is not limited to the working surface. In laser cutting and laser drilling, for example, material is also removed from beneath the surface to form slots, holes, channels and other more complex features. Depending upon application, such features are either formed to a particular depth, or penetrate through the workpiece. Laser techniques can also be used to remove larger sections of material, for example by cutting a single workpiece into two or more parts.

Laser machining is performed at wavelengths ranging from the infrared and microwave to the ultraviolet and beyond, utilizing both pulsed-beam and continuous-wave technologies. In pulsed-beam systems, the pulse width typically ranges from a few femtoseconds to many milliseconds or more, and pulse timing can be precisely controlled in order to form detailed features with reduced heating of the surrounding workpiece. Continuous-wave devices are typically used for laser cutting and other high-intensity applications, but the beam energy can also be modulated in order to reduce the intensity for engraving, surface texturing and other non-breakthrough processes.

SUMMARY

This invention concerns a laser system for machining a workpiece. The system comprises a controller, a first laser for generating a working beam, a second laser for generating a sensing beam, and an optic element positioned to form a coaxial beam by transmitting the working beam and reflecting the sensing beam. A focusing element is positioned to focus the coaxial beam onto a workpiece, such that the working beam machines the workpiece and the sensing beam reflects from the workpiece.

A sensor is positioned to sense the reflected beam intensity, and an aperture is translated along the reflected beam to locate a focus position where the reflected intensity is maximized. The controller determines a machining parameter for the working beam, based on the focus position.

DETAILED DESCRIPTION

Figure 1:
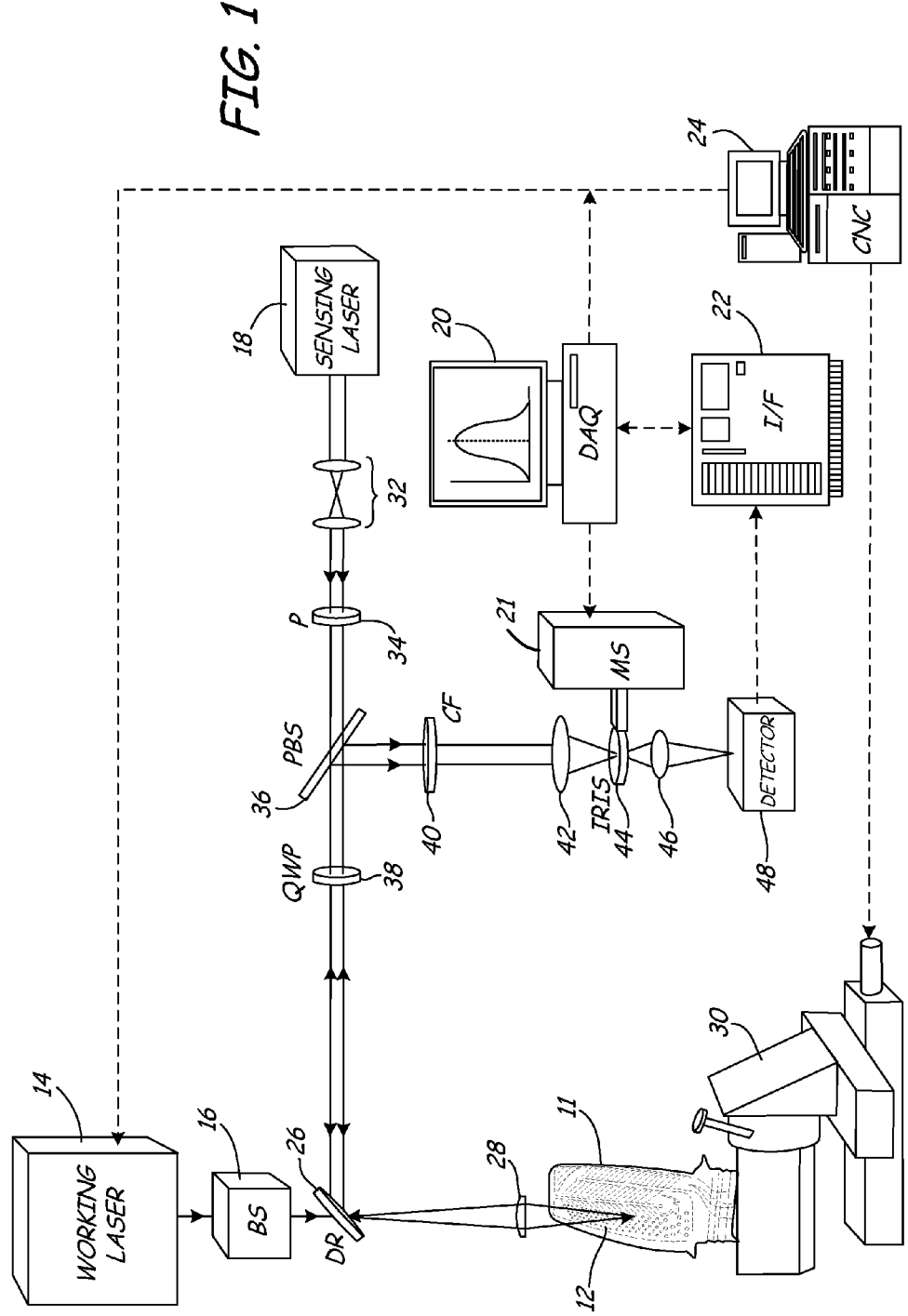
FIG. 1 is a schematic diagram of a laser machining system with machining depth and breakthrough detection.

FIG. 1 is a schematic diagram of laser machining system 10 with machining depth and breakthrough detection. System 10 controls laser machining of workpiece 11, including the formation of precision features 12.

Laser machining system 10 comprises working (or machining) laser 14 with beam shaper 16, sensing (or detecting) laser 18, data acquisition system/controller (DAQ) 20 with motion stage 21, interface (I/F) 22 and laser/CNC (continuous-path numerical control) unit 24. System 10 also comprises a number of optical elements including dichroic mirror or dichroic reflector (DR) 26 and focusing element (focusing lens) 28 for directing coaxial beams from working laser 14 and sensing laser 18 onto machine feature 12 of workpiece 11, as positioned by CNC stage 30. Additional optical elements include beam expander 32, linear polarizer 34, polarizing beam splitter (PBS) 36 for sensing laser 18, with quarter-wave plate (QWP) 38 and color filter 40. The sample beam detection apparatus includes pinhole lens 42 for iris (or pinhole aperture) 44, and final focus lens 46 for photodetector 48.

Working laser 14 and sensing laser 18 generate separate working and sensing (or sampling) beams, each with different wavelengths. Dichroic reflector/mirror element 26 directs the working beam and the sensing beam along a common coaxial beampath, and focusing lens 28 focuses the coaxial beam onto workpiece 11. Working laser 14 ablates material from workpiece 11 to create features 12, and sensing laser 18 reflects from workpiece 11 to create a reflected sensing beam.

Motion stage 21 translates iris 44 along the reflected beam to locate a focus position between pinhole lens 42 and final focus lens 46, using an active feedback system to maximize the reflected intensity at photodetector 48. DAQ 20 determines machining parameters such as feature depth and the degree of breakthrough based on the reflected intensity and the focus position, and laser/CNC controller controls working laser 14 based on the machining parameters.

In the particular embodiment of FIG. 1, workpiece 11 comprises an airfoil for a gas turbine engine, and system 10 provides depth and breakthrough detection while forming holes in the airfoil surface. Alternatively, workpiece 11 comprises one or more of an airfoil, rotor, shaft or other turbine element, or a more generalized workpiece such as a metal sheet, a substrate for electronics or electromechanical systems, or a precision machine tool or component. In these embodiments, features 12 comprise surface textures, surface engravings, surface coatings and other surface features, or holes, slots, grooves and other laser-machined features of varying depth.

As shown in FIG. 1, working laser 14 comprises a pulsed Nd:YAG (neodymium-doped yttrium aluminum garnet) infrared laser with a characteristic wavelength of about 1064 nm. In other embodiments, working laser 14 comprises an Nd:YAG system operating at a transition wavelength of about 940 nm, about 1120 nm, about 1320 nm or about 1440 nm, or a different laser system such as an Nd:YLF (neodymium-doped yttrium lithium fluoride) laser operating at a transition wavelength of about 1047 nm or about 1053 nm, or a Nd:YVO (neodymium-doped yttrium orthovanadate) laser operating at a transition wavelength of about 914 nm, about 1064 nm or about 1342 nm.

Alternatively, working laser 14 comprises a continuous-wave $CO_2$ laser with a characteristic wavelength of about 9,400 nm or about 10,600 nm, or another gas laser, solid state laser, fiber laser, semiconductor laser with tunable frequency tunable over a very wide range of wavelengths, for example using an optical programmable amplifier (OPA) or optical parametric oscillator (OPO). Depending upon embodiment, moreover, working laser 14 operates in a variety of pulsed, continuous-wave, modulated, and Q-switched modes. Working laser 14 also has tunable and frequency-doubled embodiments, for example tunable frequency-doubled Nd:YAG, Nd:YLF and Nd:YVO laser systems operating in the range of about 457-671 nm, or at other harmonics of the transition wavelength.

Beam shaper 16 shapes the cross-sectional beam profile of working laser 14. Typically, working laser 14 generates an approximately Gaussian beam, and beam shaper 16 flattens the beam to provide a more uniform or homogeneous spatial (lateral) profile.

Dichroic element 26 is provided with an optical coating, usually a thin film, in order to transmit light at one range of frequencies or wavelengths and reflect light at another range of frequencies or wavelengths. In the particular embodiment of FIG. 1, for example, dichroic element 26 is positioned to transmit the light from working laser 14 and reflect the light from sensing laser 18, such that the working beam and the sensing beam are directed along the same (coaxial) optical path. Alternatively, dichroic element 26 transmits the sensing laser and reflects the working laser, and the optical arrangement varies.

Focusing lens 28 is positioned in the coaxial beampath, in order to focus the working and sensing beams onto workpiece 11. The working beam is typically focused on or below the workpiece surface, in order to form features 12 at a particular depth. The sensing beam is typically focused at approximately the same point as the working beam, in order to reflect from workpiece 11 at approximately the machining depth, such that the reflected beam is sensitive to the machining parameters of the working beam.

CNC stage 30 positions workpiece 11 by translation and rotation, as directed by CNC/laser controller 24, in order to form features 12 in particular locations on workpiece 11. In some embodiments, laser machining system 10 utilizes additional optical elements that allow CNC/laser controller 24 to change the coaxial beam direction, in cooperation with the various motions of workpiece 11 on CNC stage 30, in order to form more complex features 12, to form features 12 more efficiently, or both.

Sensing laser 18 operates in approximately the same spectral range as working laser 14, in order to reduce chromatic aberration at focusing lens 28. In particular, the characteristic laser wavelengths are sufficiently similar for focusing lens 28 to focus the coaxial working and sensing beams to approximately the same machining depth, as defined for features 12 on workpiece 11. At the same time, the working and sensing wavelengths are sufficiently different such that one of the two is substantially transmitted by dichroic element 26, while the other is substantially reflected, in order to create a coaxial working and sensing laser beam as described above.

In addition, sensing laser 18 operates at lower intensity than working laser 14, such that sensing laser 18 does not substantially heat or ablate workpiece 11, and such that the intensity of the reflected sensing beam falls within the dynamic range of photodetector 48. In order to continuously monitor machining parameters such as feature depth and breakthrough, moreover, sensing laser 18 either operates in continuous-wave mode, or, alternatively, with a pulse rate at least as high as that of working laser 14.

In the particular embodiment of FIG. 1, working laser 14 comprises an Nd:YAG laser operating at about 1064 nm, and sensing laser 18 comprises a deep-red or red-orange laser diode operating in a range of about 650 nm to about 670 nm. In these embodiments, the characteristic wavelengths of the working and sensing beams are different by about fifty percent or more, but still lie in the same spectral range (that is, red to near infrared), such that the wavelengths differ by less than a factor of about two.

In other embodiments, sensing laser 18 comprises a tunable or single-mode diode laser with a wavelength range of about 900-2200 nm, a gas medium-based laser such as a HeNe laser with a wavelength about 632 nm, or an argon ion laser (or other ion-based laser device), operating at a transition wavelength between about 351 nm and about 529 nm. Alternatively, working laser 14 and sensing laser 18 are each selected from any of the laser systems disclosed herein, with respective intensity and wavelength characteristics as described above. In these embodiments, the working and sensing laser beam wavelengths typically differ by at least twenty percent, but fall within the same spectral range such that the wavelengths differ by less than a factor of about five. In further embodiments, dichroic element 26 provides substantial discrimination for working and sensing laser wavelengths that differ by less than twenty percent, for example ten percent or less, and focusing lens 28 provides substantial focusing for working and sensing laser wavelengths that differ by a factor of up to about ten.

Beam expander 32 expands the sensing beam diameter to achieve a higher numerical aperture. Essentially, beam expander 32 provides sensing laser 18 with greater beam width or higher divergence, or both, but without necessarily flattening or otherwise shaping the beam profile as achieved by beam shaper 16 as applied to working laser 14.

Linear polarizer 34 determines a linear beam polarization for sensing laser 18. Typically, sensing laser 18 generates a beam with some degree of linear polarization, but in some embodiments the beam is circularly polarized or only partially linearly polarized, or not polarized at all. Moreover, the polarization direction is not always easy to control at the beam source, whereas linear polarizer 34 provides direct control of the beam polarization by rotation about the beam axis, generating a sensing beam with up to essentially 100% linear polarization in the desired direction.

Beam splitter 36 reflects one beam polarization and passes another. In particular, the primary sensing beam emerging from linear polarizer 34 has a polarization that passes through beam splitter 36 toward dichroic element 26, while the reflected sensing beam from dichroic element 26 has a polarization that reflects from beam splitter 36 toward photodetector 48.

In the particular embodiment of FIG. 1, beam splitter 36 utilizes a doubly-refracting (birefringent) material such as calcite, in which the crystal lattice is split into two or more parts and then rearranged into a Wollaston prism or Nomarski prism, or a related structure. In other embodiments, beam splitter 36 utilizes a number of transparent surfaces (e.g., layers of glass). The layers are oriented at or near Brewster's angle with respect to the beam direction, such that separation of the polarization states increases at each surface. In further embodiments, beam splitter 36 utilizes a thin-film formed on a substrate such as glass, and is oriented at a particular angle with respect to the beam in order to separate polarization states based on interference effects.

Quarter-wave plate (or retarder) 38 comprises a birefringent crystal or other material with fast and slow optical axes, which shift the phase of two different (e.g., perpendicular) polarizations by one quarter of a cycle (90°, or $\pi/2$ in phase). In the case of a sensing beam with linear polarization incident at 45° between the fast and slow axes, as shown in FIG. 1, quarter-wave plate 38 generates circularly polarized light for incidence on dichroic element 26. Quarter-wave plate 38 also converts circularly polarized light (e.g., in the reflected sensing beam) into linearly polarized light. Alternatively, and dependent upon the beam direction, angle of incidence and initial polarization state, quarter-wave plate 38 generates varying degrees of elliptical and linear polarizations.

Color filter 40 filters out residual working beam content from the reflected sensing beam, passing the remainder toward iris 44 and photodetector 48. Typically, filter 40 is formed by coating optical materials onto a substrate such as glass, in order to produce a narrow-pass or monochromatic filter. The pass bandwidth corresponds to the sensing beam wavelength, such that the working beam wavelength is reflected (along with other unwanted content), while the sensing beam is transmitted.

In narrow bandpass embodiments, filter 40 sometimes comprises a dichroic filter or dichroic reflector, similar to dichroic element 26, but tuned to transmit the sensing wavelength rather than the working wavelength. Alternatively, filter 40 comprises an etalon or Fabry-Pérot interferometer, which is tuned to the sensing beam wavelength. In further embodiments, filter 40 comprises a low-pass filter, a high-pass filter or an absorptive color filter, or a combination thereof, with properties selected to pass the sensing beam wavelength and to reflect or absorb the working beam wavelength.

Pinhole lens 42 focuses the color-filtered sensing beam toward iris 44, and final focus lens 46 focuses the beam emerging from iris 44 onto photodetector 48. Iris 44 operates as a spatial filter, which is used to identify the spatial frequency distribution of the reflected sensing beam; that is, to locate a focus position along the reflected beampath.

To locate the focus, motion stage 21 translates iris 44 up and down the beampath between pinhole lens 42 and final focus lens 46, increasing or decreasing the transmitted beam intensity at photodetector 48. The transmitted beam intensity is maximized when iris 44 is positioned approximately at the focus, with a typical spatial resolution of about one micron or less. The process is repeated for each machining pulse, or continuously for modulated beams.

The focus position depends not only on the power of pinhole lens 42, but also upon the properties of the sensing beam as reflected from machining features 12 on workpiece 11, including the feature depth (or machining depth) and the degree of breakthrough, as described above. This allows CNC/laser controller 24 to precisely control working laser 14 and CNC stage 30 based on both the iris position and the reflected beam intensity, providing fast, efficient and accurate machining of features 12 on workpiece 11.

Figure 2:
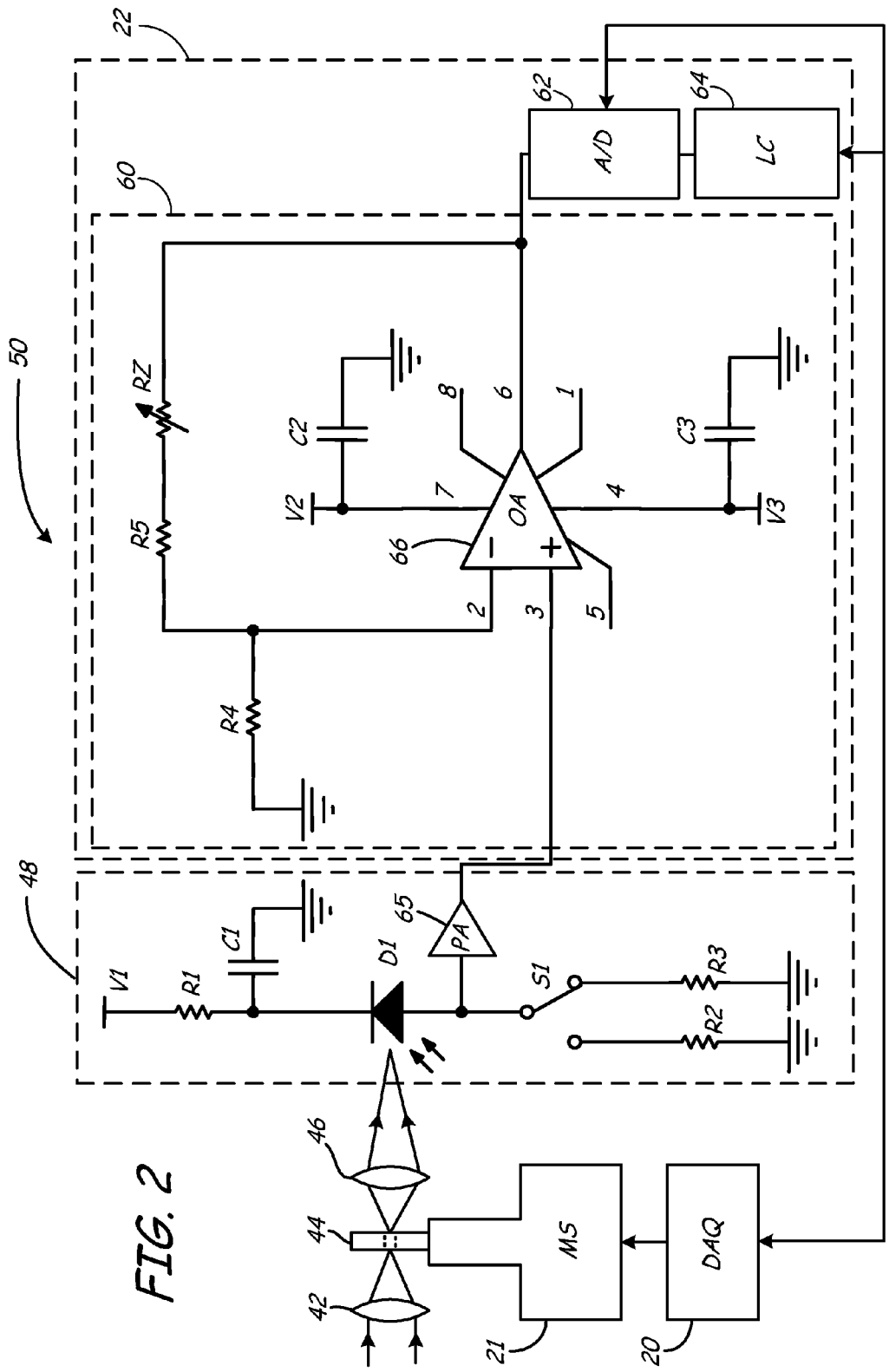
FIG. 2 is a schematic diagram of a machining depth and breakthrough detection system for laser machining.

FIG. 2 is a schematic diagram of machining depth and breakthrough detection system 50 for laser machining. In this particular embodiment, detection system 50 includes DAQ 20, motion stage 21 and interface 22, as described above with respect to FIG. 1, where interface 22 comprises amplifier 60, analog-to-digital (A/D) converter 62 and logic controller (LC) 64. In other embodiments the electronics components (DAQ 20, interface 22, amplifier 60, A/D converter 62 and logic controller 64) are discrete, or arranged into different combinations. Alternatively, each of the electronic components is comprised within a single integrated DAQ/controller 20.

Photodetector 48 comprises photosensor D1 with voltage V1 connected across resistor R1 in order to generate a voltage signal based on the intensity of the reflected sensing beam. Buffering is provided by capacitor C1, and switch S1 determines sensitivity by selecting different resistances to ground. Preamplifier (PA) 65 preamplifies and conditions the signal for delivery to amplifier 60.

In the embodiment of FIG. 2, photosensor D1 comprises a photodiode, for example a red, deep-red or red-orange diode with wavelength sensitivity between about 650 nm and about 670 nm. In these embodiments, photosensor D1 sometimes comprises a laser diode, the same as or similar to the laser diode used to generate the sensing beam, but configured to generate an output voltage based on incident laser light, rather than to generate outgoing laser light based on an input voltage. This provides photosensor D1 with a narrow, highly selective sensitivity range, which is centered on the wavelength of the sensing beam. Alternatively, photosensor D1 comprises a different photodiode or laser diode, or a different photosensor device, where the sensitivity range extends either broadly or narrowly over the sensing laser wavelength.

In one particular embodiment, voltage V1 is on the order of +12 V, resistance R1 is on the order of 1 k$\Omega$, capacitance C1 is on the order of 100 pF, and switch resistances R2 and R3 are on the order or 1 M$\Omega$ and 10 M$\Omega$, respectively, and preamplifier PA provides a gain on the order of $10^6$ to $10^7$. Alternatively, the circuit components and preamplifier gain vary.

Amplifier 60 comprises operational amplifier (op amp) 66 for amplifying signals from preamplifier (or preamp) 65 of photodetector 48. In some embodiments, op amp 66 comprises a JFET-type (junction gate field-effect transistor) operational amplifier, for example an LF356 op amp, as available from National Semiconductor of Santa Clara, Calif. In one such embodiment, differential power supply voltages V2 and V3 are on the order of ±5V, and are connected across terminals 4 and 7 with buffering capacitors C2 and C3 on the order of 100 pF. The output signal from preamp 65 of photodetector 48 is connected to input terminal 3. The output of op amp 66 is connected to A/D converter 62 via output terminal 6.

The gain of amplifier 60 depends upon the feedback circuit elements connected between input terminal 2 and output terminal 6. In the particular embodiment of FIG. 2, for example, resistance R4 (to ground) and resistance R5 (series) are each on the order of 1 k$\Omega$, with additional series resistance RZ of about 1-10 k$\Omega$ to provide variable gain. This configuration provides an amplification range of 2-12, with a non-inverted output signal range of ±5 V. In other embodiments the gain and signal range vary, and amplifier 60 provides either inverted or non-inverted output.

A/D converter 62 converts the analog output from amplifier 60 into digital form for DAQ 20. In the particular embodiment of FIG. 2, A/D converter 62 offers up to four A/D input channels, with 16-bit resolution and a sampling rate of 1 MHz or more. In some embodiments, A/D converter 62 also provides digital-to-analog (D/A) capability, for example in order to generate analog control signals for DAQ 20 to control the motion stage, or for laser/CNC stage controller 24 of FIG. 1, above.

Logic controller 64 controls the sampling rate and logic timing for A/D converter 62. Depending upon embodiment, A/D converter 62 and logic controller 64 are configured for internal triggering (e.g., based on the signal from photodetector 48), for external triggering (e.g., based on a control signal from DAQ 20), or for constant triggering based on an a priori sampling or output rate.

In the embodiment of FIG. 2, A/D converter 62 and logic controller 64 are connected via a universal serial bus (USB). The USB interface is also used for communications between DAQ 20, interface 22, utilizing standard personal computer hardware. Depending upon embodiment, dedicated serial and parallel ports are also used, for example an RS 232 serial port for serial communications between DAQ 20 and motion stage 21.

DAQ 20 controls motion stage 21 based on the signal from amplifier 60 and A/D converter 62, where the digitized signal represents the reflected sample beam intensity at photosensor D1 of photodetector 48. Specifically, DAQ 20 directs motion stage 21 to translate iris 44 along the reflected beampath, such that the reflected intensity is maximized when iris 44 is positioned approximately at the focus point.

The focus point (that is, the position of iris 44) and the reflected beam intensity each depend upon the optical characteristics of the reflected beam. The optical beam characteristics, in turn, depend upon the reflective properties of the workpiece at the machining depth. Thus the focus point and reflected intensity depend upon the machining parameters of the working beam, and the machining parameters can be determined from the focus point and reflected intensity.

In particular, the focus position and reflected intensity vary with machining depth (or feature depth) due to cavity effects, absorption, and the presence or absence of ablated material. The reflected intensity also varies as breakthrough progresses from initial penetration to complete feature formation, because more of the sensing beam is transmitted and less is reflected. Breakthrough also displaces the focus, because the sensing beam no longer reflects from any particular machining depth, but instead reflects from the sides or other optical boundaries of the feature. Surface effects also alter the focus position and reflected intensity, including surface patterning, surface texturing, engraving, etching, and the formation or removal of surface coatings.

Figure 3:
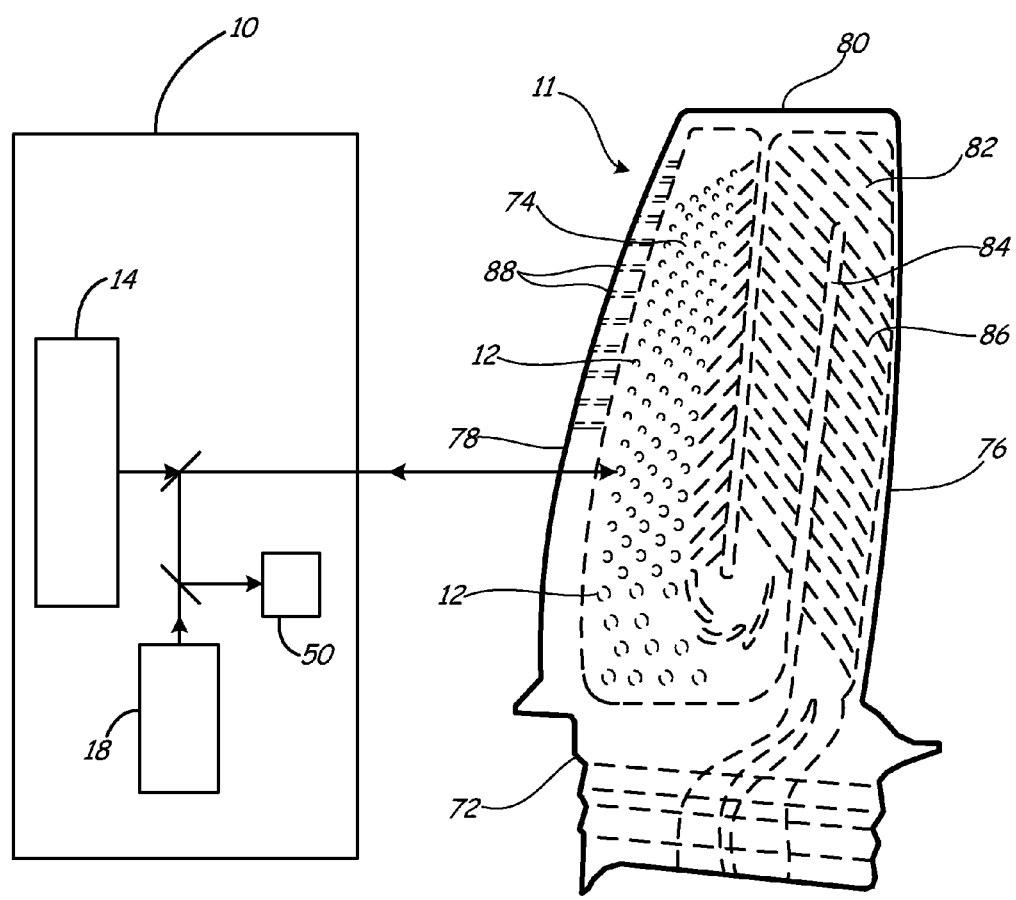
FIG. 3 is a schematic diagram of a laser machining system with real-time depth and breakthrough detection, as applied to an airfoil for a gas turbine engine.

FIG. 3 is a schematic diagram of laser machining system 10 with real-time depth and breakthrough detection provided by detection system 50, as applied to workpiece 11. In this particular embodiment, workpiece 11 comprises a blade or vane airfoil for a gas turbine engine.

In blade and vane embodiments, workpiece 11 comprises base (or platform) section 72 and airfoil section 74. Airfoil section 74 extends from platform 72 along leading edge 76 and trailing edge 78, with concave and convex (pressure and suction) surfaces formed therebetween.

In rotor blade embodiments, airfoil section 74 typically extends in a radially outward direction from platform 72 to airfoil tip 80, or to a squealer tip, knife edge seal or rotating shroud. In stator vane embodiments, airfoil section 74 extends either inwardly toward a rotating hub, shaft or similar flow path element, or outwardly toward a shroud, casing or other fixed flow boundary.

As shown in FIG. 3, airfoil section 74 is hollow, with internal cooling passages 82 formed between internal walls 84 to provide cooling fluid flow. In some embodiments, turbulators or other flow structures 86 are provided in cooling passages 82 to improve heat transfer.

In the particular embodiment of FIG. 3, laser machined features 12 comprise holes formed in airfoil section 74, for example film cooling holes of various diameter, which are distributed along the pressure and suction surfaces between leading edge 76 and trailing edge 78. Laser machining is also utilized to form features of varying cross-section, such as cooling slots 88 on trailing edge 78.

When forming cooling holes or other features 12, there is a substantial potential for back-strike damage after laser breakthrough. This is particularly true for complex workpieces 11 having inner cavities or other internal structures, for example cooling passages 82 and inner walls 84 of airfoil section 74. As a result, it is important to carefully regulate the laser machining process, and in particular to limit the number, duration and intensity of pulses after breakthrough is achieved.

Breakthrough depth varies across airfoil section 74, however, depending upon drilling angle and wall thickness at each particular feature location. The breakthrough depth is also different for features 12 formed as cooling holes in the pressure and suction surfaces, as compared to other features such as cooling slots 88 formed along trailing edge 78, and for features formed in double-walled airfoil sections 74. Manufacturing variations also affect the composition, thickness and geometry of workpiece 11, for example core shift during the casting of airfoils and other complex hollow parts.

Laser breakthrough, moreover, is not a discrete process. After initial penetration, additional working beam pulses (for continuous-wave beams, additional machining times) are typically required in order to completely form features 12. This is true not only at steep milling and machining angles, but also in perpendicular processes where cavity effects, beam focusing, and heat transfer act to reduce uniformity, particularly at the edges of features 12.

In general, the interior of airfoil section 74 (and other hollow workpieces 11) is filled with a protective backing or filler material during machining, which provides a certain level of protection from back-strike damage. Typically, the backing materials have a relatively low melting temperature (e.g., paraffin wax and polymer-based fill materials), making removal relatively simple after laser machining is completed. Unfortunately, these materials are relatively easily penetrated at typical working beam intensities, and thus do not eliminate back-strike damage. In addition, while anti-spallation coatings are often applied to the surface of workpiece, these do not protect against internal back-strike damage, and in any case more efficient machining reduces the need for either form of protection.

To accomplish this, laser machining system 10 utilizes system 50 to detect laser breakthrough in real time. In particular, breakthrough is indicated based on a substantial loss in the reflected beam intensity (e.g., a loss of about 50% or more, or a loss of about 80% or more), or based on a shift in the focus point, or both. Laser machining system 10 ceases pulsing of machining laser 14 as full breakthrough is achieved, protecting against back-strike damage by reducing "through-hole" pulses and over-drilling.

Real-time depth and breakthrough detection also reduce the chance of under-drilling, as opposed to systems that utilize a fixed number of machining or cleanup pulses, and then simply hope for the best. Laser machining system 10, on the other hand, utilizes breakthrough and depth detection system 50 to determine the number of machining and cleanup pulses for each individual feature, increasing or decreasing the number of each pulse type as necessary in order to ensure complete breakthrough without substantial after-pulsing.

In some embodiments, initial breakthrough is indicated when the working beam first pierces the workpiece or substrate, but before feature formation is complete. Typically, the initial breakthrough condition is indicated based on a relatively small change in the reflected beam intensity (e.g., less than about 50%, or about 20% or less), or based on a similarly scaled change in the focus position, or both.

Initial breakthrough detection allows the number of cleanup pulses to be carefully controlled based on the degree of breakthrough, providing uniform finished feature geometry without excessive drill-through. In some of these embodiments, the laser pulse intensity is also modulated such that breakthrough is completed with a relatively lower-intensity beam. The use of relatively low-power cleanup pulses provides additional back-strike protection, as compared to systems in which the machining and cleanup pulses have the same intensity, because the cleanup pulses are less likely to penetrate the backing or fill material, and less prone to cause back-strike damage if they do.

Systems 10 and 50 also provide depth control based on surface reflection, absorption and cavity effects, which cause the focus position and reflected beam intensity to vary with machining or feature depth as described above. In particular, depth detection allows systems 10 and 50 to control the machining depth independently of breakthrough, increasing precision for non-breakthrough features.

In some embodiments, the working laser is also modulated as a function of the machining depth, improving both precision and uniformity by performing the final milling, cutting and drilling steps at lower working laser power. Depth detection also allows system 10 to predict breakthrough based on known wall thickness and other workpiece geometry, so that not only the cleanup pulses but also the initial breakthrough pulses are achieved at lower intensity. This provides additional improvements in feature uniformity, while further reducing the risk of back-strike damage. Depth-based power modulation also improves the accuracy of surface machining techniques, including etching, engraving, texturing, cleaning, surface preparation and the formation or removal of surface coatings.

Figure 4:
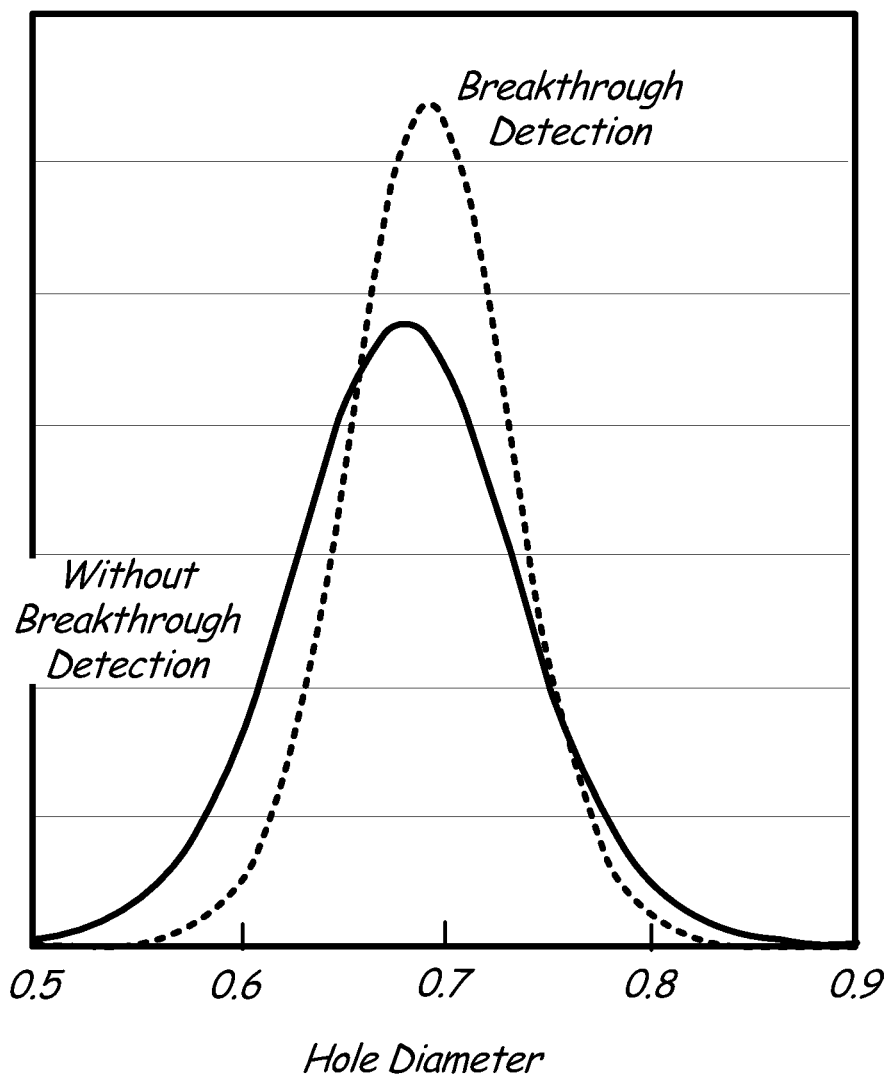
FIG. 4 is a distribution of laser-machined exit hole diameters, as formed with and without real-time breakthrough detection and depth control.

FIG. 4 is a distribution of laser-machined exit hole diameters, as formed with and without real-time breakthrough detection and depth control. As shown in FIG. 4, the hole variation is reduces, such that the distribution of hole diameters is substantially narrower when breakthrough detection is utilized to control the hole depth, as compared to a baseline process utilizing a fixed number of working beam pulses.

In particular, hole depth is precisely measured at the submicron level by finding the peak signal during drilling and communicating to the logic control when the signal drops, so that a feedback signal can be relayed to cease laser pulsing the moment the working beam pierces the machining substrate. Depth and end point detection also provides for real-time monitoring of the laser machining process, enabling precise parameter adjustment during and after breakthrough in order to prevent incomplete holes, minimize thermal signatures, and reduce back-strike damage to internal cavities.

These techniques enable greater control of hole size and other feature parameters. Feature-to-feature variation is also reduced, with more uniform depth and geometry. For airfoils and other actively-cooled components in particular, precise, consistent laser machining also produces more consistent airflow. This in turn improves engine performance, durability and service life, reducing thermal stresses and metallurgy effects due to unnecessary overheating, and decreasing the need for airflow monitoring.

Additional benefits extend to a variety of different airfoil and non-airfoil components, with both single & double walled configurations. These benefits include decreased process cycle time, reduced need for poly-fill, paraffin or wax backing materials, less refixturing and reworking time for under-drilled holes and other under-machined features, with reduced over-drilling and back-strike damage, and lower scrap rates due to punchthrough. These cost reductions are particularly important for laser machining, as this is typically among the last manufacturing processes performed on a variety of high-cost hardware.

While the invention has been described with reference to exemplary embodiments, it will be understood by those skilled in the art that various changes may be made and equivalents may be substituted without departing from the spirit of the invention. In addition, modifications may be made to adapt a particular situation or material to the teachings of the invention without departing from the essential scope thereof. The invention, therefore, is not intended to be limited to the particular embodiments disclosed herein, but will include all embodiments falling within the scope of the appended claims.

The invention claimed is:

1. A system comprising:
a working laser beam;
a sensing laser beam;
a first optical element for generating a coaxial beam from the working laser beam and the sensing laser beam;
a second optical element for focusing the coaxial beam onto a workpiece, such that the working laser beam machines the workpiece and the sensing laser beam reflects from the workpiece;
an optical sensor for sensing an intensity of the reflected sensing beam;
a motion stage having an aperture, the motion stage positioned proximate the reflected sensing beam such that the motion stage translates an aperture along the sensing beam, wherein
the intensity of the reflected sensing beam is maximized at the optical sensor when the aperture is at a focus position; and
a data acquisition controller, wherein the data acquisition controller:
is capable of determining a machining parameter of the working laser beam based on the focus position; and
is capable of determining a degree of breakthrough based on the intensity of the reflected sensing beam and the focus position.

2. The system of claim 1, wherein the sensing laser beam has a different wavelength from the working laser beam.

3. The system of claim 1, wherein the controller determines the degree of breakthrough by:
moving the aperture along the reflected sensing beam to maximize the intensity of the reflected sensing beam at the optical sensor; and
determining the machining parameter based on the focus position and the intensity of the reflected sensing beam.

4. The system of claim 1, wherein the machining parameter is indicative of breakthrough of the working laser beam.

5. The system of claim 4, wherein the controller ceases pulsing of the working laser beam based on the breakthrough.

6. The system of claim 1, wherein the machining parameter is indicative of a machining depth of the working laser beam.

7. The system of claim 6, wherein the controller modulates the working laser beam based on the machining depth.

8. The system of claim 7, wherein the controller modulates the working laser beam such that the intensity of the working laser beam is reduced during breakthrough.

9. The system of claim 1, wherein the machining parameter is indicative of a surface feature machined onto the workpiece by the working laser.

10. The system of claim 1, wherein the machining parameter is indicative of a surface coating removed from the workpiece by the working laser.

11. A laser system comprising:
a first laser for generating a working beam;
a second laser for generating a sensing beam;
a dichroic element positioned to form a coaxial beam by transmitting the working beam along a coaxial beampath and reflecting the sensing beam along the coaxial beampath;
a focusing element positioned to focus the coaxial beam onto a workpiece, such that the working beam machines the workpiece and the sensing beam reflects from the workpiece;
a sensor positioned to sense an intensity of the reflected sensing beam;
a translating aperture positioned on a motion stage, wherein the translating aperture is positioned at a focus position of the reflected sensing beam by the motion stage, and the translating aperture and motion stage are movable longitudinally along the reflected sensing beam; and
a controller coupled to the first laser for controlling an intensity of the working beam based on the focus position and the sensed intensity of the reflected sensing beam.

12. The laser system of claim 11, further comprising a processor for determining breakthrough of the working beam based on the focus position and the intensity of the reflected sensing beam.

13. The laser system of claim 12, where the controller controls the intensity of the working beam by ceasing pulsing of the first laser based on the breakthrough.

14. The laser system of claim 11, further comprising a processor for determining a machining depth of the working beam based on the focus position.

15. The laser system of claim 14, wherein the controller controls the intensity of the working beam by modulating a power output of the first laser based on the machining depth.

16. A laser system for machining a workpiece, the system comprising:
a first laser producing a first laser beam at a first characteristic wavelength;
a second laser producing a second laser beam at a second characteristic wavelength, different from the first characteristic wavelength;
a dichroic reflector positioned to transmit one of the first and second laser beams along a coaxial beampath and to reflect another of the first and second laser beams along the coaxial beampath;
a lens positioned in the coaxial beampath to focus the first and second laser beams onto the workpiece, such that the first laser beam ablates the workpiece to form a feature and the second laser beam reflects from the workpiece to form a sensing beam;
a photosensor positioned in the reflected sensing beam, such that the photosensor senses a reflected intensity of the second laser beam;
a motion stage positioned proximate the reflected sensing beam, such that the motion stage translates an iris to a focus point along the sensing beam; and
a laser controller coupled to the first laser, such that the laser controller controls a depth of the feature based on the reflected intensity and the focus point.

17. The laser system of claim 16, wherein the laser controller controls the depth of the feature by modulating a power output of the first laser based on the focus point.

18. The laser system of claim 16, wherein the laser controller controls the depth of the feature by ceasing pulsing of the first laser based on breakthrough.

19. The laser system of claim 16, wherein the laser controller modulates the power output of the first laser such that the power output is reduced during breakthrough.

20. The laser system of claim 16, wherein the laser controller ceases pulsing of the first laser based on removal of a surface coating from the workpiece.

* * * * *